(12) United States Patent
Romo (10) Patent No.: US 6,883,380 B2
(45) Date of Patent: Apr. 26, 2005

(54) PRESSURE SENSOR CAPSULE (76) Inventor: Mark G. Romo, 8630 Coachmans La., Eden Prairie, MN (US) 55347

( * ) Notice: Subject to any disclaimer, the term of this patent is extended or adjusted under 35 U.S.C. 154(b) by 21 days.

(21) Appl. No.: 10/439,698

(22) Filed: May 16, 2003

(65) Prior Publication Data
US 2004/0226383 A1 Nov. 18, 2004

(51) Int. Cl.[7] .................................................. G01L 7/10
(52) U.S. Cl. ..................... 73/729.2; 73/715; 73/723; 73/753
(58) Field of Search ..................... 73/700–756

(56) References Cited

U.S. PATENT DOCUMENTS

| | | | |
|---|---|---|---|
| 4,675,643 A | 6/1987 | Tanner et al. ............... 338/4 |
| 4,773,269 A | 9/1988 | Knecht et al. .............. 73/706 |
| 4,790,192 A | 12/1988 | Knecht et al. .............. 73/721 |
| 5,212,989 A | * 5/1993 | Kodama et al. ............. 73/706 |
| 5,327,785 A | * 7/1994 | Maurer ....................... 73/756 |
| 5,731,522 A | 3/1998 | Sittler ........................ 73/708 |
| 6,658,940 B1 | * 12/2003 | Burczyk et al. ............. 73/715 |
| 2002/0100333 A1 | 8/2002 | Gravel et al. ............... 73/756 |

FOREIGN PATENT DOCUMENTS

| | | |
|---|---|---|
| EP | 317 664 A1 | 11/1987 |
| EP | 751 385 A2 | 5/1996 |
| WO | WO 97/21986 | 6/1997 |

OTHER PUBLICATIONS

International Search Report for International Application No. PCT/US2004/015139, filed May 13, 2004. Mailing date Nov. 15, 2004.

* cited by examiner

Primary Examiner—Edward Lefkowitz
Assistant Examiner—Jermaine Jenkins (57) ABSTRACT A pressure sensing capsule includes a pressure sensor inside a capsule wall. The capsule wall includes a feedthrough opening. The pressure sensor is mounted to a stress isolation member with a feedthrough hole. The pressure sensor is mounted to the stress isolation member with the feedthrough hole overlying electrical contacts on the pressure sensor.

34 Claims, 6 Drawing Sheets

PRESSURE SENSOR CAPSULE

BACKGROUND OF THE INVENTION

Pressure transmitters and other pressure sensing instruments include a pressure sensor that senses pressure in a process fluid. The pressure sensor provides an electrical output on leads to an electrical circuit that generates a pressure transmitter (or pressure instrument) output in a standardized electrical format.

There is a desire to have the electrical output of the pressure sensor be substantially free of errors due to environmental conditions surrounding the pressure sensor. In practice, however, isolation of the pressure sensor from its environment is difficult and results in large and expensive mounting structures for pressure sensors.

Errors can be introduced by stress on the sensor from its mounting, from electrical leads, and from the high temperatures of process fluids that present temperature gradients. Errors can also be introduced by corrosion or contamination of the sensor and its leads by chemicals in the process fluids. Errors can also be introduced due to stray electrical currents flowing from electrical leads to the environment. The sensor includes multiple isolation structures for connection to the pressure, connection to electrical leads, and for mounting to provide mechanical support for the sensor.

A low cost way of mounting and isolating a pressure sensor is needed that is compatible with high temperature, corrosive or contaminating process fluids and electrical isolation requirements and which reduces the cost and complexity of multiple isolation structures.

SUMMARY OF THE INVENTION

Disclosed is a capsule including an inlet tube for receiving and sensing a pressure. The capsule includes a capsule wall with a fluid inlet coupled to an inlet tube. The capsule wall also includes a feedthrough opening and an internal sealing surface surrounding the feedthrough opening.

The pressure sensor is mounted within the capsule wall. The pressure sensor includes a sensor element, electrical contacts on an outer surface of the pressure sensor and circuit traces coupled between the electrical contacts and the sensor element.

The capsule includes a stress isolation member with a feedthrough hole. The stress isolation member has a first member surface bonded to the pressure sensor and a second member surface bonded to the sealing surface. The feed through hole overlies the electrical contacts.

Other features and benefits that characterize embodiments of the present invention will be apparent upon reading the following detailed description and review of the associated drawings.

DETAILED DESCRIPTION OF THE PREFERRED EMBODIMENTS

In the present invention, a pressure sensor is mounted within a surrounding capsule wall. The capsule wall serves to separate the pressure sensor from a surrounding environment and to protect the sensor from damage. The sensor is mounted to a stress isolation member, and the stress isolation member is mounted to the capsule wall. The stress isolation member isolates the pressure sensor from mounting stress. The stress isolation member has a feedthrough hole that is aligned with a feedthrough opening in the capsule wall. The sensor has electrical contacts that are aligned with the feedthrough hole. The arrangement of the stress isolation member provides both mechanical mounting and electrical feedthrough in a single mechanical interface region, thus reducing the number of interfaces between the sensor and its environment to only a single interface region. The capsule provides a low cost way of mounting and isolating a pressure sensor that is compatible with high temperature, corrosive or contaminating process fluids. The use of expensive commercial electrical feedthroughs with glass-to-metal seals is avoided. The mounting can provide galvanic isolation of the pressure sensor that is needed for intrinsic safety approval. A flex circuit or spring loaded pins can conveniently connect directly to electrical contacts on the pressure sensor without any additional hardware. With only a single mounting interface region, the remainder of the sensor is suspended and there is no danger of stress due to movement of one mounting region relative to another mounting region.

Figure 1:
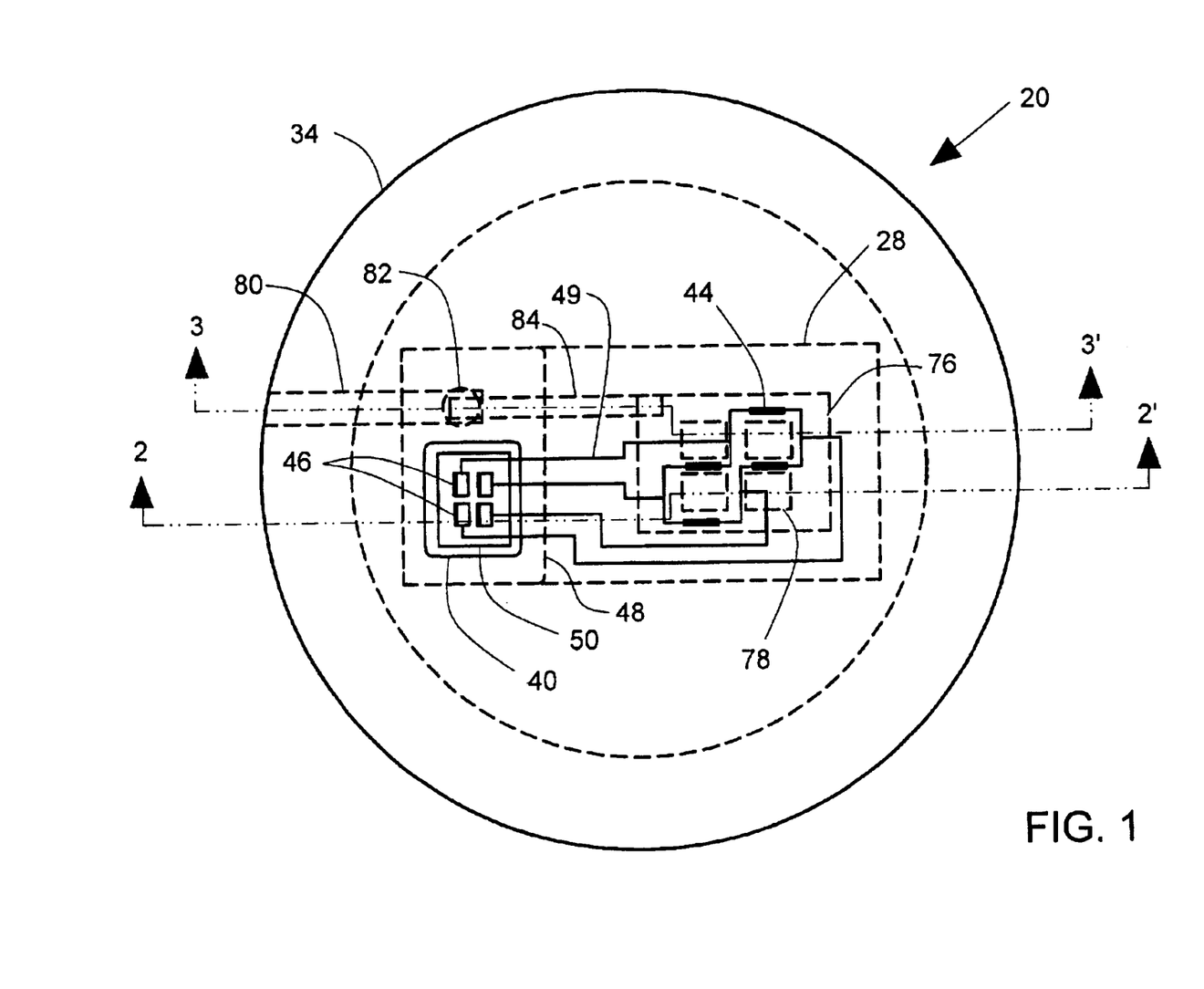
FIG. 1 illustrates a plan view of a first embodiment of a capsule for sensing pressure.
Figure 2:
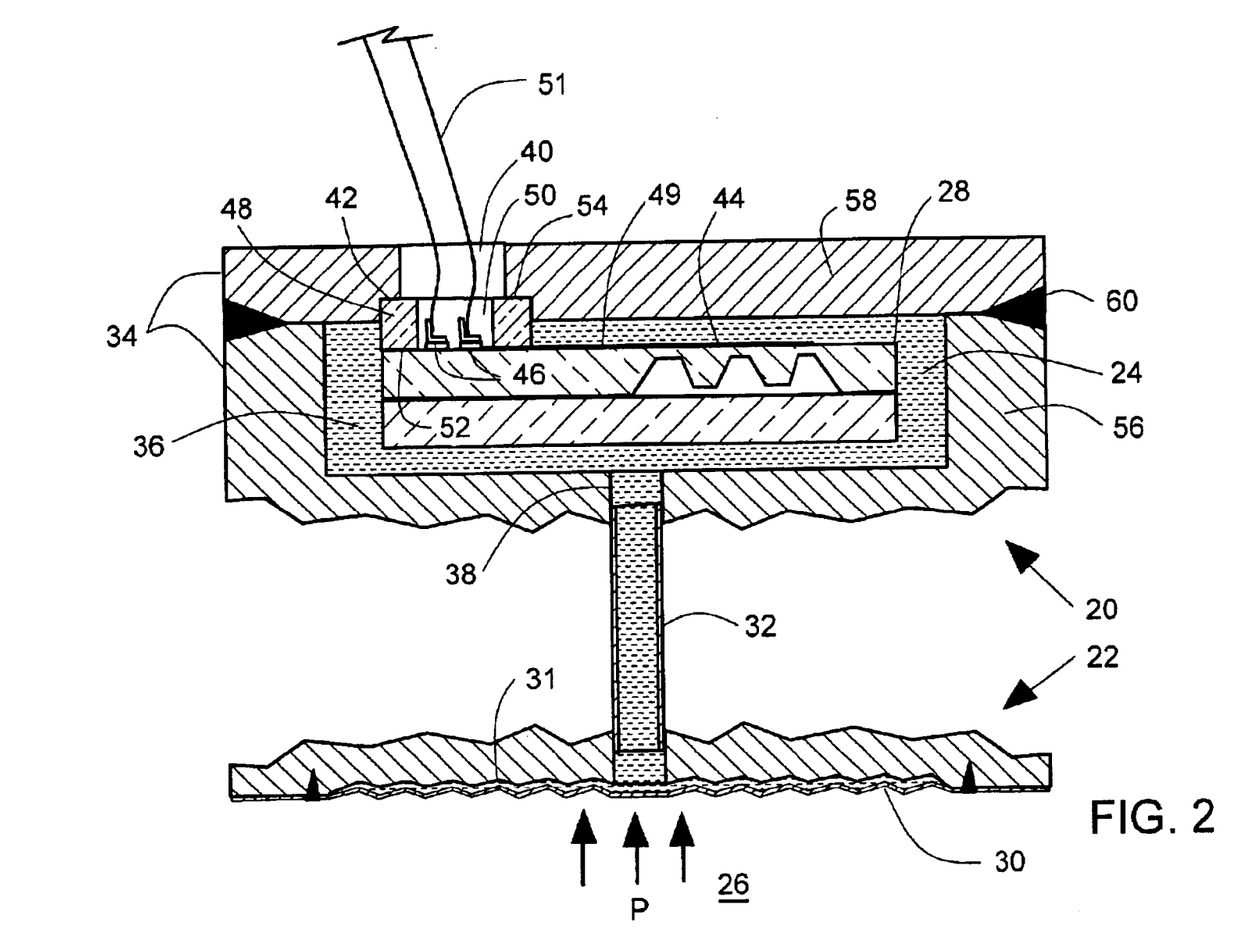
FIG. 2 illustrates a cross-sectional view of the capsule along line 2–2' in FIG. 1.
Figure 3:
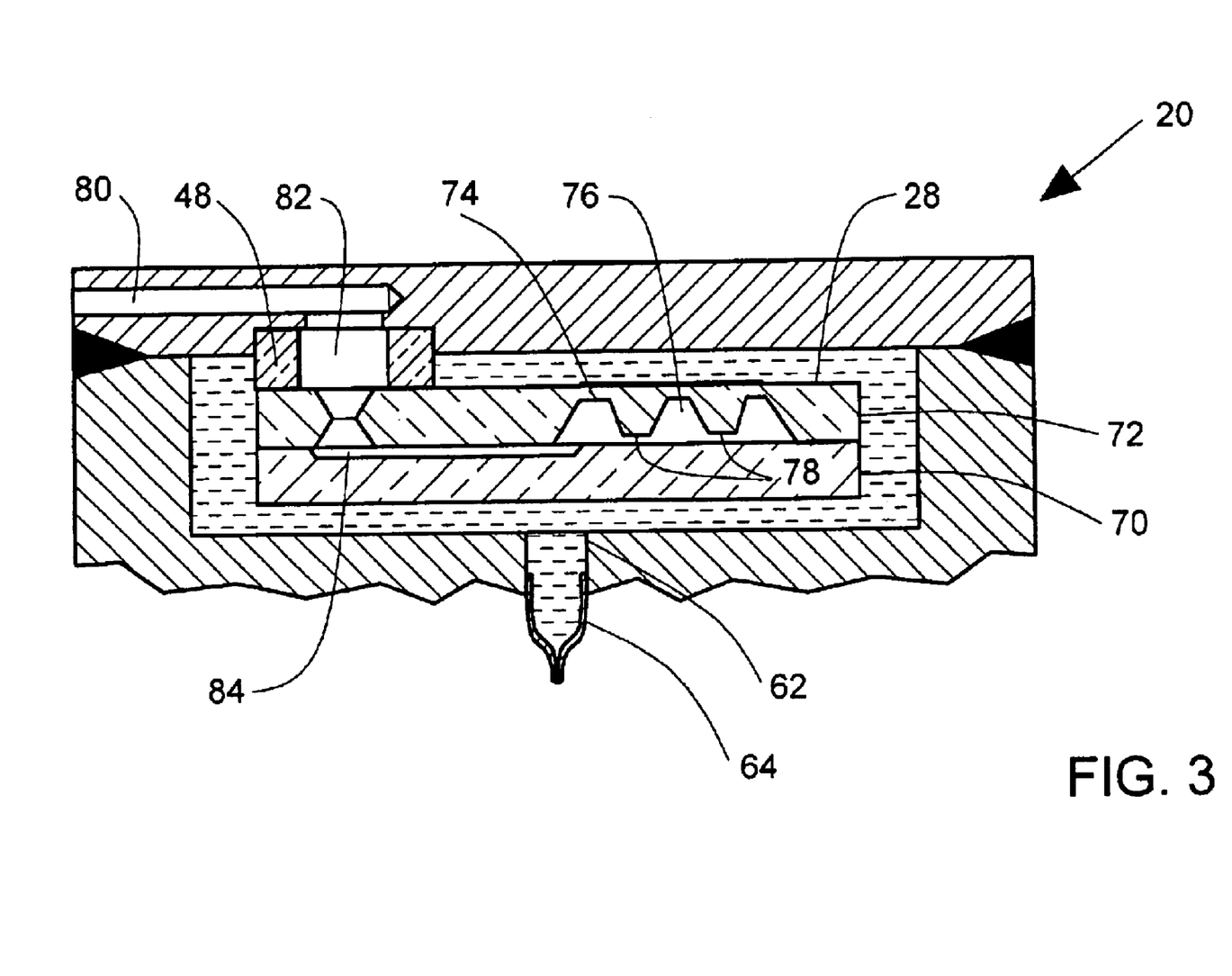
FIG. 3 illustrates a cross-sectional view of the capsule along line 3–3' in FIG. 1.

FIGS. 1–3 illustrate a first embodiment of a capsule 20 that is coupled to a fluid isolator 22. Referring now to FIG. 2, an isolator fluid 24, preferably silicone oil, transfers pressure "P" from a process fluid 26 to a pressures sensor 28 in the capsule 20. The arrangement permits the process pressure P to be sensed by the pressure sensor 28 and at the same time permits the pressure sensor 28 to be protected from damaging chemical contact with the process fluid 26. The isolator 22 includes an easily deflectable isolator diaphragm 30 that is preferably formed of circularly corrugated metal foil. The isolator diaphragm 30 is preferably welded or soldered at a peripheral edge and shaped hydrostatically in place to precisely fit corrugations 31 on its mounting surface. In one preferred embodiment, the isolator 22 is an integral part of the capsule 20 which has the advantage of compactness and low cost. In another preferred embodiment, the isolator 22 is spaced apart from the capsule 20, and the isolator fluid 24 is coupled between the isolator 22 and the capsule 20 by a capillary tube 32. The arrangement with the capillary tube 32 has the advantage of providing improved thermal isolation between the process fluid 26 and the pressure sensor 28.

The capsule 20 includes a capsule wall 34 that encloses the pressure sensor 28 in a capsule cavity 36 that is filled with the isolator fluid 24. The capsule wall 34 includes a fluid inlet 38 that is couplable to the fluid isolator 22. The capsule wall 34 also includes a feedthrough opening 40 and an internal sealing surface 42 surrounding the feedthrough opening 40.

The isolator fluid 24 is contained by the capsule wall 34 and couples pressure from the fluid isolator 22 to the pressure sensor 28 for sensing. The pressure sensor 28 is placed within the capsule wall 34. The pressure sensor 28 includes a sensor element 44, electrical contacts 46 spaced apart from the sensor element 44 and circuit traces 49 coupled between the electrical contacts 46 and the sensor element 44. The sensor element 44 is preferably a thin film strain gage element deposited on an outer surface of the pressure sensor 28 and the circuit traces 49 are preferably formed of the same thin film material as the strain gage. Diffused strain gages and other known types of strain gages can be used as well. The sensor element 44 can be also be a capacitive sensor element inside the sensor 28.

A stress isolation member 48 includes a feedthrough hole 50. The stress isolation member 48 has a first member surface 52 bonded to the pressure sensor 28 and a second member surface 54 bonded to the sealing surface 42. The feed through hole 50 overlies the electrical contacts 46. In a preferred arrangement, the sealing surface 42 is recessed slightly as illustrated to provide for accurate positioning of the stress isolation member 48 prior to welding, soldering or brazing.

The pressure sensor 28 is mounted only at the stress isolation member 48, and the remainder of the pressure sensor 28 is freely suspended in the isolation fluid 24. Preferably, the sensing element 44 is spaced apart from the stress isolation member 48 and the contacts 46 so that it is difficult to transmit stress from the mounting or leads to the sensing element 44. Errors in the pressure sensor output on leads 51 is reduced.

In a preferred embodiment, the pressure sensor 28 is formed of a low mechanical hysteresis material. Silicon, which can be conveniently etched to a desired shape, is preferred for the low mechanical hysteresis material. Other low hysteresis materials, however, such as sapphire, quartz, vitreous silica and ceramics can also be used. The capsule wall 34 is preferably formed of metal such as stainless steel.

In one preferred arrangement, the stress isolation member 48 is formed of a material with a temperature coefficient of expansion that is substantially the same as a temperature coefficient of expansion as the sensor material.

In one embodiment, the stress isolation member 48 is formed of a material with a temperature coefficient of expansion that is intermediate between the temperature coefficients of the sensor material and the sealing surface 42.

In another preferred arrangement, the stress isolation member 48 is formed of a material that has a lower modulus of elasticity than the sensor material. The lower modulus stress isolation material bends or distorts to reduce transfer of stress from sealing surface 42 to the sensor 28 when the sealing surface 42 expands due to temperature increase.

In yet another preferred arrangement, the stress isolation member 48 is formed of a material selected to have both a temperature coefficient that is matched to the sensor material and a low modulus of elasticity relative to the sensor material. Each of these material features contributes to reducing the variation in stress transferred to the sensor due to temperature change. In one preferred arrangement, the stress isolation material comprises a silicon nitride based ceramic material that is formulated to match the expansion coefficient of the sensor material.

The stress isolation material preferably comprises electrically insulating material to avoid shorting to circuit traces 49, and also to galvanically isolate the pressure sensor 28 from the capsule wall 34.

The stress isolation member 48 defines a solid mounting region between the pressure sensor 28 and its mounting environment. Portions of the pressure sensor 28 that lie outside the stress isolation member are suspended in liquid and not subject to application of any mounting stress. Mounting stress on the pressure sensor 28 can thus be effectively controlled by use of the stress isolation member 48.

When the stress isolation member 48 is formed of a metal alloy, it is preferably elongated and selectively heat treated or annealed to have a lower elastic modulus relative to the material of sensor 28. The stress isolation member 48 can be formed of a stack of metal washers or members, brazed together, with varying elastic moduli and/or thermal expansion coefficient.

Figure 4:
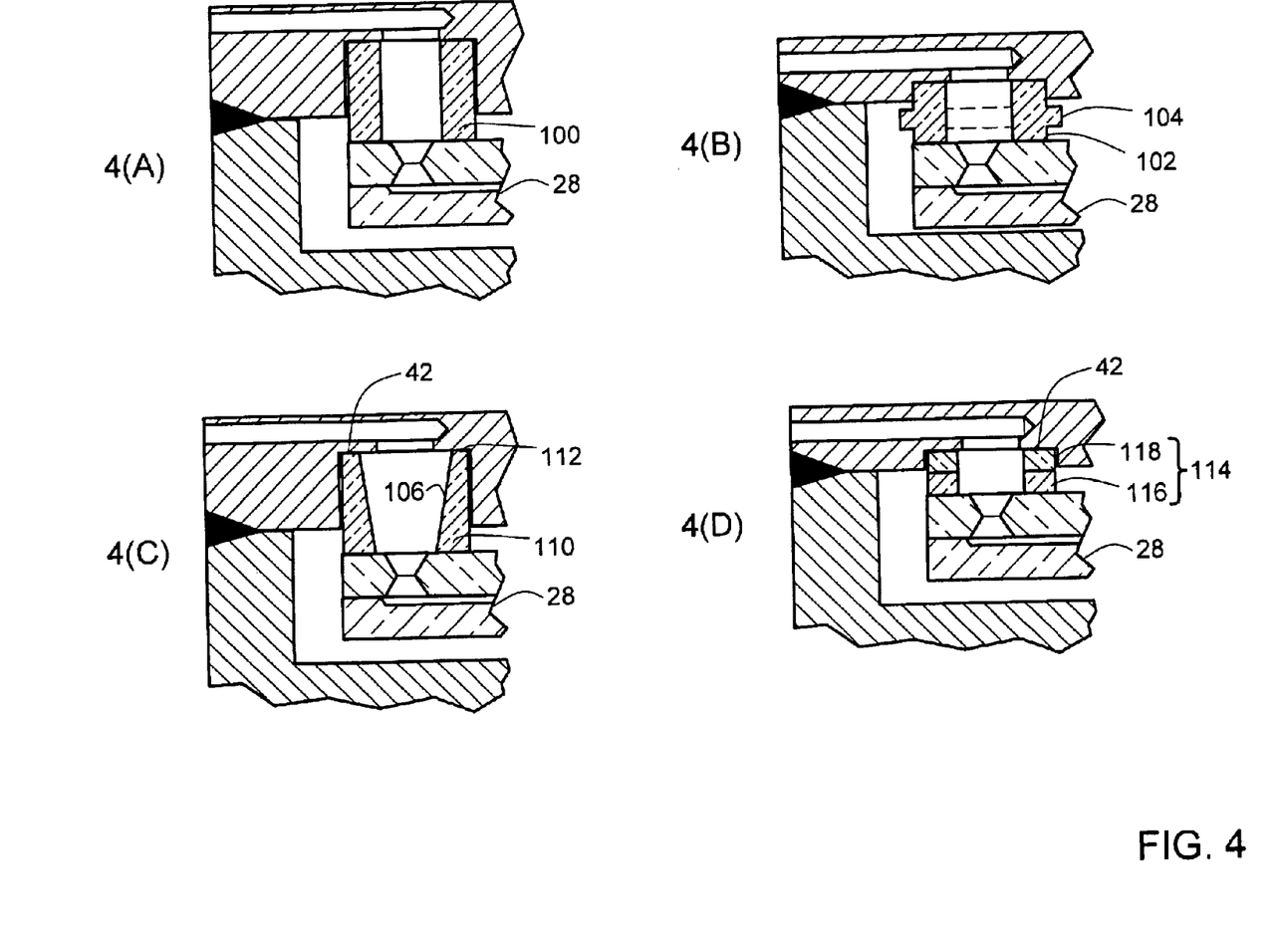
FIG. 4 illustrates alternative embodiments of stress isolation members.

FIGS. 4(A)–(D) illustrate various embodiments of the stress isolation member. As illustrated in FIG. 4(A), a stress isolation member 100 can be elongated to reduce transmission of mounting stress to the pressure sensor 28. As illustrated in FIG. 4(B), a stress isolation member 102 can be provided with a stiffening shoulder 104 to reduce transmission of stress to the pressure sensor 28. As illustrated in FIG. 4(C), a stress isolation member 106 can have a wall 108 that tapers from a thicker region 110 adjacent the pressure sensor 28 to a thinner region 112 adjacent sealing surface 42. As illustrated in FIG. 4(D), a stress isolation member 114 can comprise a first layer 116 formed of lower elastic modulus material, or a material with a thermal expansion coefficient matched to the material of the sensor 28 regardless of its elastic modulus. The first layer 116 is joined to a second layer 118, adjacent the sealing surface 42 that is formed of a material with a thermal expansion coefficient that is intermediate between the thermal expansion coefficients of the first layer 116 and the sealing surface 42 on the capsule wall. The variations illustrated in FIGS. 4(A)–4(D) are illustrative of many shapes that the stress isolation member can take. Tapers can be in a direction opposite to that shown in FIG. 4(C), and grooves can be used in place of a shoulder. Other variations in shape of the stress isolation member will be apparent to those skilled in the art. Material can be selected to have desired elastic moduli or temperature coefficients of expansions in combinations that reduce stress transmission to the pressure sensor.

In one preferred arrangement, the pressure sensor 28 can be bonded to the stress isolation member 48 with glass frit. In another preferred arrangement, the circuit traces 49 are routed inside the pressure sensor 28 and the pressure sensor 28 is bonded to the stress isolation member 48 with solder.

The stress isolation member 48 is preferably bonded to the capsule wall 34 by either braze or solder material or by welding. The capsule wall preferably comprises a round cup 56 joined to a round cap 58 by a weld joint 60. In a preferred arrangement, the cap 58 comprises a thin member that is deflectable to provide overpressure protection for the pressure sensor 28 by allowing the isolator diaphragm 30 to bottom out on corrugations 31.

In another preferred arrangement shown in FIG. 3, the capsule wall 34 includes a sealable opening 62 for receiving the isolator fluid 24. The sealable opening 62 can be sealed by a fill tube 64 or by pressing a steel ball in the sealable opening 62 after filling with the isolator fluid 24. Sealable opening 62 is optional, and the seal off port can alternatively be included in the fluid isolator 22.

The pressure sensor preferably includes first and second layers 70, 72 (shown best in FIG. 3) bonded together and formed of silicon. The shaping of the layer 72 forms a diaphragm 74 overlying a sensor cavity 76 inside the silicon pressure sensor 28. The diaphragm 74 preferably includes overpressure stops 78 protruding into the sensor cavity 76 that support the diaphragm under overpressure conditions.

In another preferred arrangement, the capsule wall 34 includes an optional vent opening 80 (FIG. 3), the stress isolation member 48 includes an optional vent feedthrough 82 and the pressure sensor 28 include an optional vent passageway 84 extending from the sensor cavity 76 to the vent feedthrough 82 as illustrated in FIG. 3. The arrangement with the optional vent opening 80 permits sensing of gage pressure rather than absolute pressure.

The capsule 20 is compact, economical and provides high quality isolator for the pressure sensor from its environment including mounting stress, lead stress, chemical contamination and stray electrical currents.

Figure 5:
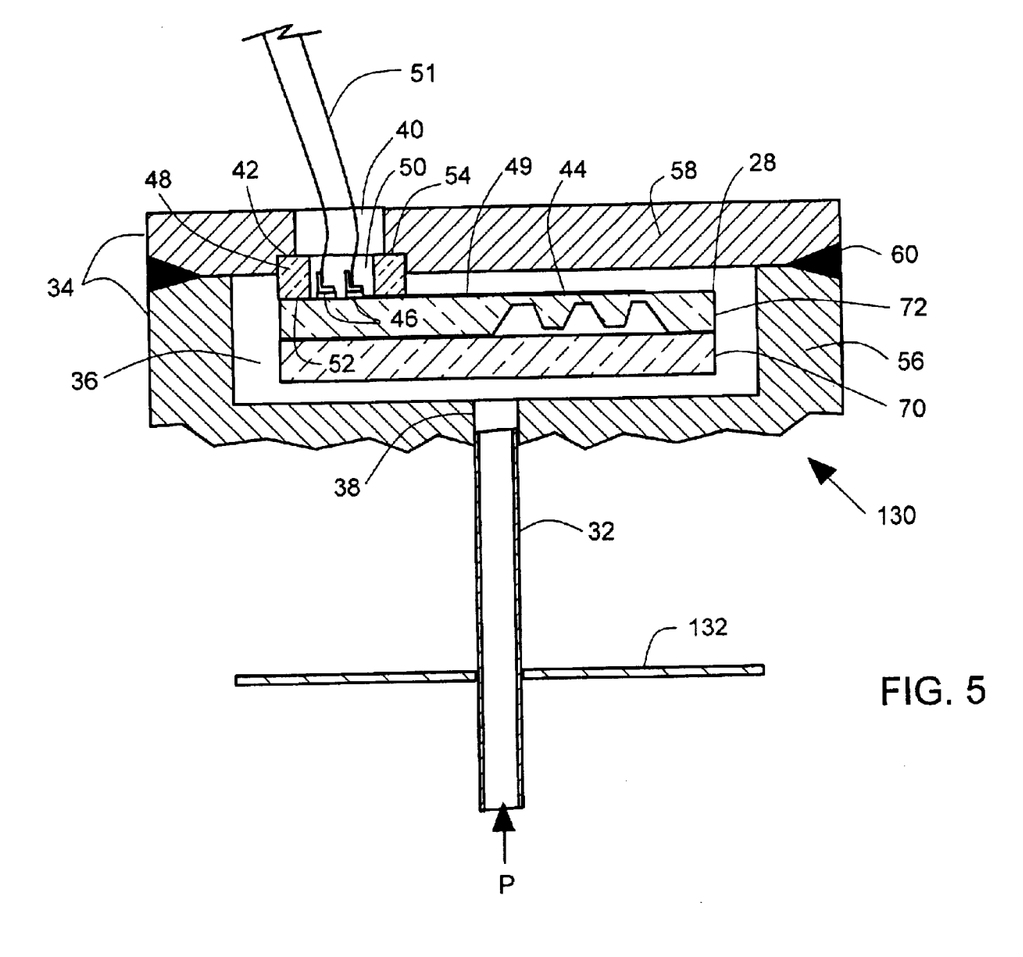
FIG. 5 illustrates a cross-sectional view of a second embodiment of a capsule that does not require isolation fluid.

FIG. 5 illustrates a cross-sectional view of a second embodiment of a capsule 130 that does not require isolation fluid. The capsule 130 illustrated in FIG. 5 is similar to the capsule 20 illustrated in FIGS. 1–2. Reference numbers used in FIG. 5 that are the same as reference numbers used in FIGS. 1–2 identify the same or similar features. In FIG. 5, the inlet tube 32 passes through a wall 132 to sense a pressure P at a remote location. In one preferred embodiment, the pressure P is sensed in a ventilation duct and the wall 132 is a wall of a ventilation duct.

Figure 6:
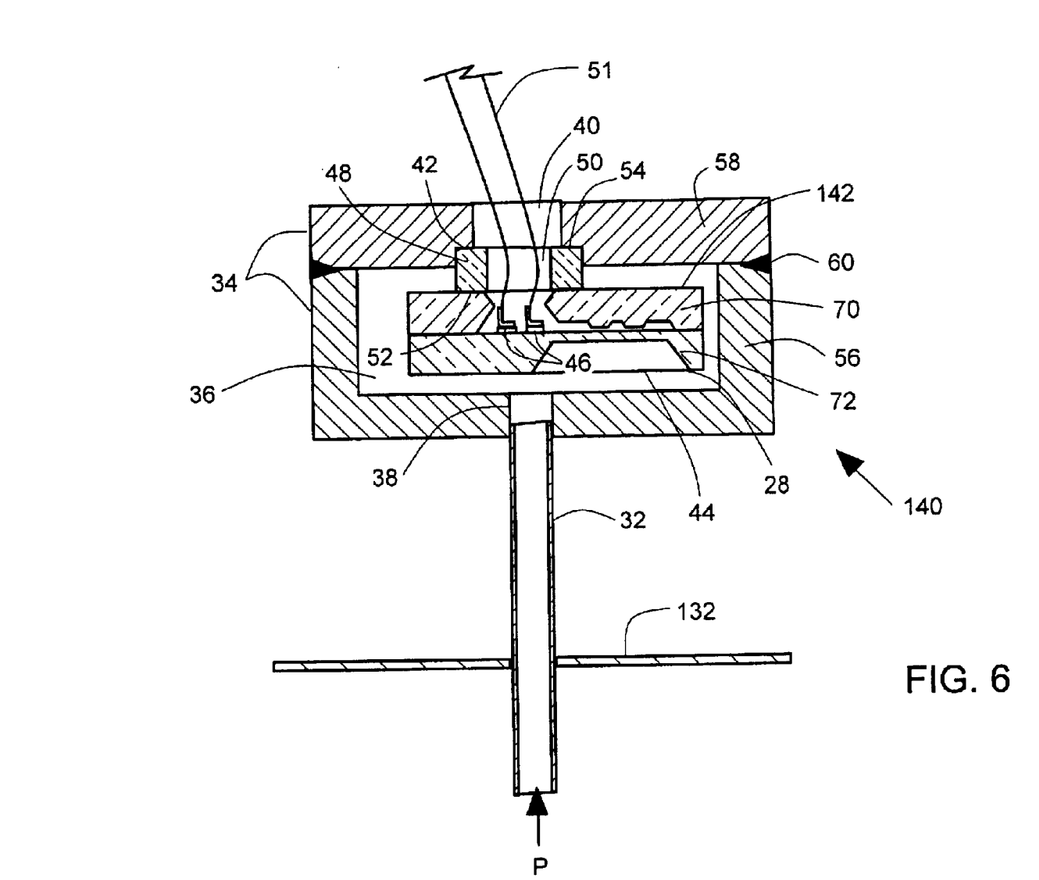
FIG. 6 illustrates a cross-sectional view of a third embodiment of a capsule that does not require isolation fluid.

FIG. 6 illustrates a cross-sectional view of a third embodiment of a capsule that does not require isolation fluid. The capsule 140 illustrated in FIG. 6 is similar to the capsule 130 illustrated in FIG. 5. Reference numbers used in FIG. 6 that are the same as reference numbers used in FIG. 5 identify the same or similar features. In FIG. 6, the pressure sensor 142 is inverted relative to the pressure sensor 28 in FIG. 5. In FIG. 6, the stress isolation member 48 is on the first layer 70 and the electrical contacts 46 are on second layer 72 as illustrated. The arrangement in FIG. 6 provides a very compact, low cost pressure sensor and capsule.

Although the present invention has been described with reference to preferred embodiments, workers skilled in the art will recognize that changes may be made in form and detail without departing from the scope of the invention.

What is claimed is:

1. A capsule couplable to a fluid isolator, comprising:
   a capsule wall having a fluid inlet couplable to the fluid isolator, a feedthrough opening and an internal sealing surface surrounding the feedthrough opening;
   isolator fluid contained by the capsule wall and coupling pressure from the fluid isolator;
   a pressure sensor within the capsule wall, the pressure sensor including a diaphragm layer, electrical contacts and a sensor element that are disposed on the diaphragm layer, and circuit traces disposed on the diaphragm layer that are coupled between the electrical contacts and the sensor element; and
   a stress isolation member having a feedthrough hole overlying the electrical contacts and having a first member surface bonded to the pressure sensor and a second member surface bonded to the sealing surface, the stress isolation member providing mechanical mounting of the pressure sensor and electrical feedthrough of the electrical contacts.

2. The capsule of claim 1 wherein the pressure sensor is formed of a brittle material, the capsule wall is formed of metal and the stress isolation member is formed of a stress isolation material with a temperature coefficient of expansion that is substantially the same as a temperature coefficient of expansion of the pressure sensor.

3. The capsule of claim 2 wherein the stress isolation material comprises a silicon nitride-based ceramic material.

4. The capsule of claim 2 wherein the stress isolation material comprises an electrically insulating material.

5. The capsule of claim 1 wherein the pressure sensor comprises a sensor material, and the stress isolation member comprises a stress isolation material that has a temperature expansion coefficient that is intermediate between the temperature expansion coefficients of the sensor material and the capsule wall material.

6. The capsule of claim 1 wherein the pressure sensor comprises a silicon pressure sensor, and further comprising glass frit bonding the first member surface to the pressure sensor.

7. The capsule of claim 1 wherein the pressure sensor comprises a silicon pressure sensor, and further comprising solder bonding the first member surface to the pressure sensor.

8. The capsule of claim 1 wherein the pressure sensor comprises a silicon pressure sensor, and further comprising solder bonding the second member surface to the capsule wall.

9. The capsule of claim 1 wherein the pressure sensor comprises a silicon pressure sensor, and further comprising braze material bonding the first member surface to the pressure sensor.

10. The capsule of claim 1 wherein the pressure sensor comprises a silicon pressure sensor, and further comprising braze material bonding the second member surface to the capsule wall.

11. The capsule of claim 1 wherein the pressure sensor comprises a silicon pressure sensor, and further comprising a weld joint joining the second member surface to the capsule wall.

12. The capsule of claim 1 wherein the capsule wall comprises a cup joined to a cap by a weld joint.

13. The capsule of claim 12 wherein the cap comprises a thin member that is deflectable to provide overpressure protection for the pressure sensor.

14. The capsule of claim 1 wherein the fluid isolator is joined to the fluid inlet by a tube.

15. The capsule of claim 1 wherein the fluid isolator is mounted on the capsule wall.

16. The capsule of claim 1 wherein the capsule wall further comprises a sealable opening for receiving the isolator fluid.

17. The capsule of claim 1 wherein the isolator fluid comprises silicone oil.

18. The capsule of claim 1 wherein the pressure sensor includes first and second layers bonded together, the first and second layers being shaped to form a diaphragm overlying a sensor cavity inside the pressure sensor, the pressure sensor being supported by the isolator fluid.

19. The capsule of claim 18 wherein the diaphragm includes overpressure stops protruding into the sensor cavity that support the diaphragm under overpressure conditions.

20. The capsule of claim 18 wherein the capsule wall includes a vent opening, the stress isolation member includes a vent feedthrough and the pressure sensor include a vent passageway extending from the sensor cavity to the vent feedthrough.

21. The capsule of claim 18 wherein the stress isolation member defines a single solid mounting region between the pressure sensor and its mounting environment.

22. The capsule of claim 18 wherein portions of the pressure sensor that lie outside the stress isolation member are suspended in liquid and not subject to application of any substantial mounting stress.

23. The capsule of claim 18 wherein the stress isolation member is elongated.

24. The capsule of claim 18 wherein the stress isolation member has a contoured shape that enhances stress isolation.

25. The capsule of claim 24 wherein the contoured shape is selected from the group of: a stiffening shoulder, a groove, a tapered wall that tapers from a thicker region adjacent the pressure sensor to a thinner region adjacent the sealing surface, and a tapered wall that tapers from a thinner region adjacent the pressure sensor to a thicker region adjacent the sealing surface.

26. The capsule of claim 1 wherein the sensor element is disposed away from the connection of the pressure sensor to the stress isolation member.

27. The capsule of claim 26 wherein the stress isolation member has a thermal expansion coefficient adjacent the pressure sensor that is matched to a thermal coefficient of the pressure sensor and a thermal expansion coefficient adjacent the sealing surface that is matched to the thermal expansion coefficient of the sealing surface.

28. The capsule of claim 27 wherein the stress isolation member comprises a stack of metal washers with varying thermal expansion coefficients.

29. A pressure sensor capsule, comprising:
a capsule wall having a fluid inlet, a feedthrough opening and an internal sealing surface surrounding the feedthrough opening;
an inlet member coupling pressure to the fluid inlet;
a pressure sensor within the capsule wall, the pressure sensor including a diaphragm layer, electrical contacts and a sensor element that are disposed on the diaphragm layer, and circuit traces disposed on the diaphragm layer that are coupled between the electrical contacts and the sensor element; and
a stress isolation member having a feedthrough hole overlying the electrical contacts and having a first member surface bonded to the pressure sensor and a second member surface bonded to the sealing surface, the stress isolation member providing mechanical mounting of the pressure sensor and electrical feedthrough of the electrical contacts.

30. The pressure sensor capsule of claim 29, wherein the pressure sensor is formed of a sensor material, and the stress isolation member is formed of a stress isolation material with a temperature coefficient of expansion that is substantially the same as a temperature coefficient of expansion of the sensor material.

31. The capsule of claim 30 wherein the stress isolation material comprises a silicon nitride based ceramic material.

32. The capsule of claim 29 wherein the capsule wall comprises a cup joined to a cap by a joint.

33. The capsule of claim 29 wherein the stress isolation member defines a single solid mounting region between the pressure sensor and its mounting environment.

34. The capsule of claim 29 wherein portions of the pressure sensor that lie outside the stress isolation member are suspended and not subject to application of any substantial mounting stress.

* * * * *

UNITED STATES PATENT AND TRADEMARK OFFICE
CERTIFICATE OF CORRECTION

PATENT NO.        : 6,883,380 B2                                              Page 1 of 1
APPLICATION NO. : 10/439698
DATED             : April 26, 2005
INVENTOR(S)       : Mark G. Romo It is certified that error appears in the above-identified patent and that said Letters Patent is hereby corrected as shown below:

TITLE PAGE
Please add --(73) Assignee: Rosemount Inc., Eden Prairie, MN (US)--

Signed and Sealed this

Twenty-fifth Day of July, 2006

JON W. DUDAS
*Director of the United States Patent and Trademark Office*